(12) United States Patent
Tidestav et al.

(10) Patent No.: US 8,767,574 B2
(45) Date of Patent: Jul. 1, 2014

(54) METHOD AND ARRANGEMENT FOR RECEIVE POWER ESTIMATION IN A MOBILE RADIO COMMUNICATIONS SYSTEM

(75) Inventors: Claes Tidestav, Bålsta (SE); Henrik Nyberg, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 212 days.

(21) Appl. No.: 13/144,151

(22) PCT Filed: Feb. 4, 2009

(86) PCT No.: PCT/SE2009/050115
§ 371 (c)(1),
(2), (4) Date: Jul. 12, 2011

(87) PCT Pub. No.: WO2010/090560
PCT Pub. Date: Aug. 12, 2010

(65) Prior Publication Data
US 2011/0280146 A1 Nov. 17, 2011

(51) Int. Cl.
*H04W 4/00* (2009.01)
(52) U.S. Cl.
USPC .......................................... 370/252
(58) Field of Classification Search
None
See application file for complete search history.

(56) References Cited

U.S. PATENT DOCUMENTS

| | | | |
|---|---|---|---|
| 2002/0122471 A1* | 9/2002 | Ling | 375/147 |
| 2010/0074128 A1* | 3/2010 | Ishii | 370/252 |
| 2010/0315947 A1* | 12/2010 | Wigren | 370/230 |

FOREIGN PATENT DOCUMENTS

| | | |
|---|---|---|
| EP | 1 480 350 | 11/2004 |
| WO | WO 00/70773 | 11/2000 |

OTHER PUBLICATIONS

3GPP TS 25.214; 3rd Generation Partnership Project; Technical Specification Group Radio Access Network; Physical Layer Procedures (FDD) (Release 8), V.84.0, (Dec. 2008).
International Search Report for PCT/EP2009/050115, mailed Nov. 13, 2009.
International Preliminary Report on Patentability for PCT/EP2009/050115, completed Mar. 15, 2011.
Melvasalo et al., "Semi-Blind Channel Estimation in HSDPA Systems", *Signals, Systems and Computers*, Oct. 2005, pp. 1292-1296.
Sony Corporation, "UE complexity for AMCS", *3PGG Draft*, Jan. 2001, p. 2.
"Radio Resource Control (RRC); Protocoll specification", *3PGG TS25.331 V8.5.0*, Dec. 2008, p. 745.
Lucent Technologies, "PARC with APP decoding for HSDPA", *3PGG Draft*, Apr. 2002, p. 1.

\* cited by examiner

*Primary Examiner* — John Blanton
(74) *Attorney, Agent, or Firm* — Nixon & Vanderhye, P.C.

(57) ABSTRACT

The present invention relates to a method and apparatus for estimating a received signal power of a first transmission channel at a receiving node in a communications system wherein a received signal comprises information transmitted by a transmitting node over at least two transmission channels. The received signal power of a second of the at least two transmission channels is measured, and together with an estimate of the relationship between the transmission power of the second transmission channel and the transmission power of the first transmission channel; the measurement of the received signal power is used in estimating the received signal power of the first transmission channel.

17 Claims, 8 Drawing Sheets

METHOD AND ARRANGEMENT FOR RECEIVE POWER ESTIMATION IN A MOBILE RADIO COMMUNICATIONS SYSTEM

This application is the U.S. national phase of International Application No. PCT/SE2009/050115 filed 4 Feb. 2009 which designated the U.S., the entire content of which is hereby incorporated by reference.

TECHNICAL FIELD

The present invention relates to the field of mobile radio communications, and in particular to the estimation of received signal power at a receiving node in a mobile radio communications system.

BACKGROUND

Measurements of Signal-to-Interference Ratios play an important role in the control of many aspects of a mobile radio communications system. For example, in a communications system operating according to the WCDMA technology, a radio base station regularly measures the Signal-to-Interference Ratio (SIR) of signals received from a mobile station (MS) in order to be able to provide the MS with adequate power control commands. Since WCDMA uplink channels from different MSs are non-orthogonal, signals from different MSs will interfere with each other, and unless power control is employed, the inter-user interference will cause the transmissions from some MSs to drown in the transmissions from other MSs. The transmission conditions for an MS change at a short time scale as the MS and/or other objects along the transmission path move. Hence, a fast uplink power control mechanism is essential. Often, a SIR estimate used for uplink power control is generated as soon as an uplink signal has been received, before the signal is decoded. The SIR estimate is then compared to a target SIR, and a power control command is sent to the MS in accordance with the result of this comparison.

Since WCDMA uplink channels are non-orthogonal, the interference in a cell is a limiting factor, which determines the amount of uplink data that can be transmitted in the cell. In order to increase the capacity of a cell, interference cancellation mechanisms have been introduced in some communications systems. When interference cancellation is employed, interference from other channels is removed from the received signal prior to decoding, and hence, a higher interference level can be tolerated before a signal, received at a certain received signal power, becomes non-decodable.

As the interference cancellation allows for decoding of a received signal at higher interference levels, the received signal power measurements used for the SIR estimation will have to be performed at increased interference levels. This leads to a decreased accuracy of the received signal power measurements, and thus to a reduced efficiency of the uplink power control.

SUMMARY

A problem to which the present invention relates is the problem of how to obtain an improved estimate of the received signal power of a transmission channel, in order to improve the control and thereby the performance of a mobile radio communications system.

This problem is addressed by a method of estimating a received signal power of a first transmission channel at a receiving node in a communications system wherein a received signal comprises information transmitted by a transmitting node over at least two transmission channels. The method comprises measuring the received signal power of a second of the at least two transmission channels; estimating a relationship between the transmission power of the second transmission channel and the transmission power of the first transmission channel; and estimating the received signal power of the first transmission channel using the measurement of the received signal power of the second transmission channel and said estimated relationship.

The problem is further addressed by a received signal power estimator adapted to receive a signal comprising information transmitted by a transmitting node over at least two transmission channels, where the received signal power estimator is adapted to estimate a received signal power of a first of said transmission channels. The received signal power estimator is adapted to measure the signal power of at least a second of said transmission channels and to estimate a relationship between the transmission power of the second transmission channel and the transmission power of the first transmission channel. The received signal power estimator is further adapted to estimate the received signal power of the first transmission channel based on a result of the measurement of the signal power of the second transmission channel and said estimated relationship.

By means of the inventive method and apparatus is achieved that a more accurate estimate of the received signal power of the first transmission channel can be obtained, since estimates of the received signal power of the first channel can be derived from measurements on a second transmission channel having a higher received signal power than the desired received signal power of the first channel. Thus, an accurate measurement of the received signal power of the first channel can be obtained in a transmission environment of higher interference.

In order to further improve the estimate of the received signal power of the first transmission channel, measurements of the received signal power of further transmission channels may advantageously be made, which measurements, in combination with estimates of the relationships between the transmission powers of the further transmission channels and that of the first transmission channel, can be used in estimating the received signal power of the first transmission channel.

The relationship between the transmission power of a second or further transmission channel and that of the first transmission channel may often successfully be obtained by estimating the ratio between the transmission power of the second or further transmission channel to that of the first transmission channel, thereby obtaining a scaling factor of the second or further transmission channel. By applying the second or further scaling factor to the measured value of the received signal power of the second or further transmission channels, a channel specific estimator of the received value of the first transmission channel is obtained. This channel specific estimator may advantageously be used in the estimating of the received signal power of the first transmission channel.

In estimating the ratio of the transmission powers, known values of the ratio at least one previous point in time may advantageously be used.

When more than one channel specific estimators is used in estimating the received signal power of the first transmission channel, weight coefficients for the channel specific estimators may advantageously be determined and applied in the estimation. Hereby is achieved that channel specific estimators for which the accuracy is doubtable may be given a lower weight, thus improving the accuracy of the estimate of the received signal power of the first transmission channel. When determining the weight coefficients of a channel specific estimator, a comparison of the channel specific estimator to previous values of the channel specific estimator, and/or to channel specific estimators of other transmission channels, may advantageously be made.

The problem is further addressed by a computer program product for estimating a received signal power of a first transmission channel at a receiving node in a communications system wherein a received signal comprises information transmitted by a transmitting node over at least two transmission channels.

The invention can advantageously be applied to mobile radio communications systems wherein interference cancellation is employed. By improving the accuracy of the measurement of received signal power, the received signal power can be estimated with sufficient accuracy at higher interference levels, and hence, adequate power control may be maintained at higher interference levels, thereby allowing for an increase in the capacity of the communications system.

ABBREVIATIONS

| | |
|---|---|
| 3GPP | 3rd Generation Partnership Project |
| DPCCH | Dedicated Physical Control CHannel |
| DPDCH | Dedicated Physical Data CHannel |
| E-DPCCH | Enhanced Dedicated Physical Control CHannel |
| E-DPDCH | Enhanced Dedicated Physical Data CHannel |
| HS-DPCCH | High Speed Dedicated Physical Control Channel |
| MS | Mobile Station |
| RSCP | Received Signal Code Power |
| SIR | Signal-to Interference Ratio |
| TDMA | Time Division Multiple Access |
| TS | Technical Specification |
| TTI | Transmission Time Interval |
| WCDMA | Wideband Code Division Multiple Access |

BRIEF DESCRIPTION OF THE DRAWINGS

For a more complete understanding of the present invention and the advantages thereof, reference is now made to the following description taken in conjunction with the accompanying drawings, in which.

DETAILED DESCRIPTION

Figure 1:
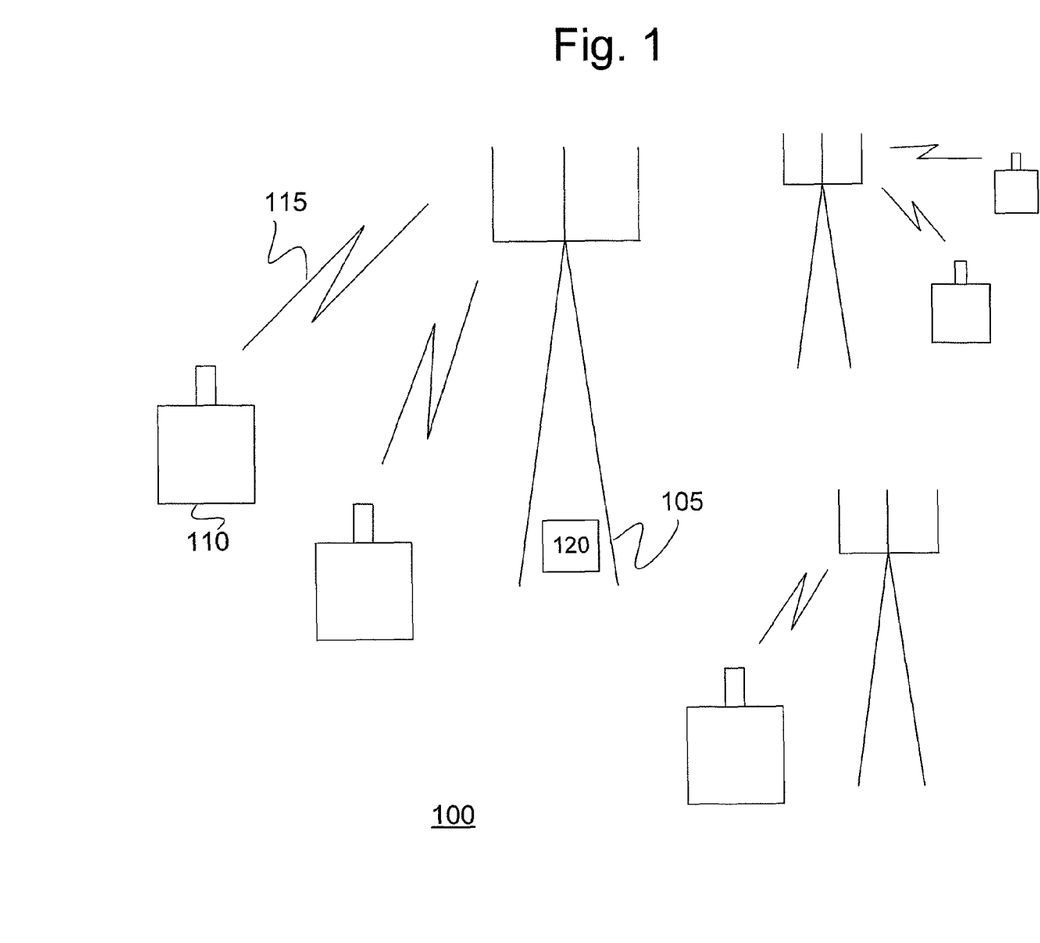
FIG. 1 is a schematic overview of a mobile radio communications system.

A schematic illustration of a mobile radio communications system 100 is provided in FIG. 1. Mobile radio communications system 100 comprises a plurality of base stations 105. A base station 105 can communicate with MSs 110 over a radio interface 115. A base station 105 is connected to further nodes in the mobile radio communications system 100, not shown in FIG. 1.

Figure 2:
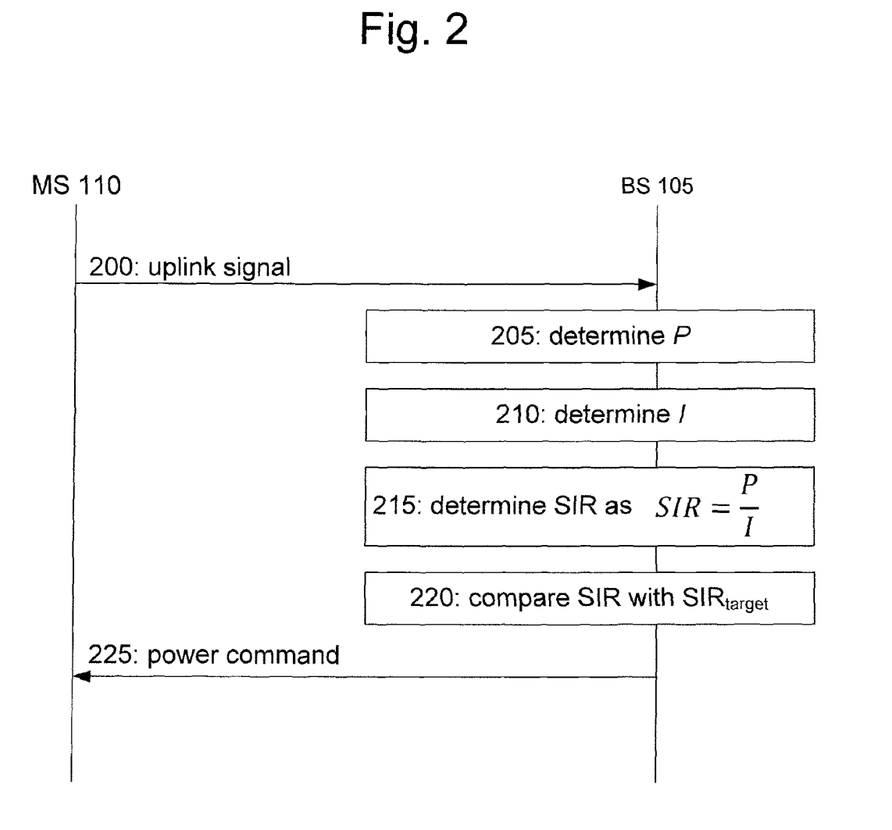
FIG. 2 is a signalling diagram illustrating an uplink power control scenario in a mobile radio communications system.

A signalling diagram, illustrating a closed-loop uplink power control scheme which can be used when interference cancellation is employed, is shown in FIG. 2. An MS 110 transmits an uplink signal 200 to a base station 110. At event 205, the base station 110 detects the signal 200 and determines the received signal power P of signal 200. At event 210, the base station 110 determines an interference value l to be used for SIR estimation of the signal 200. At event 215, the base station 110 determines a SIR value from the following relation:

$$SIR = \frac{P}{I}, \quad (1)$$

At event 220, the determined value of SIR is compared to a target value of SIR, $SIR_{target}$, in order to conclude whether the uplink transmission power should be increased or reduced. A power command 225, containing a power control instruction in accordance with the comparison result, is then transmitted from the base station 105 to the MS 110. The uplink power control procedure illustrated in FIG. 2 will typically be repeated at very short time intervals, typically several times per TTI.

As discussed above, the amount of interference tolerated in a mobile radio communications system will increase when an interference cancellation procedure is employed. The more efficiently an interference cancellation procedure cancels the interference of a received signal, the more interference can be tolerated in the system 100 with maintained decodability of the received signal. However, with an increased interference in a cell, the reliability of the measured received signal power of a signal will decrease. Therefore, it is often not possible to utilize the full potential of an interference cancellation scheme, since the increased interference this would yield would cause the reliability of the measured received uplink signal power to deteriorate to a degree where the SIR values obtained via expression (1) would not be good enough to provide adequate power control.

In a mobile radio communications system 100 wherein a signal may comprise information transmitted by a transmitting node over at least two transmission channels, an improved value of the received signal power of a first of the transmission channels can be obtained by utilising measurements of the received signal power of at least a second of the transmission channels, if the relation between the signal powers of the first and the second transmission channels is known or can be estimated.

Improving the estimated received signal power of a first transmission channel by utilising measurements of the received signal power of at least a second transmission channel transmitted by the same transmitting node can greatly improve uplink power control, and hence the performance, of a mobile radio communications system 100 wherein the transmission power of at least a second transmission channel is set in dependence of the transmission power on a first of the transmission channels. This is for example the case in a communications system 100 operating according to the WCDMA standard, wherein the transmission powers of uplink channels are set in dependence of the transmission power on the so called Dedicated Physical Control CHannel (DPCCH). Therefore, the present technology is highly relevant to the mobile radio communications systems 100 operating according to the WCDMA standard. However, the present technology can be applied to a communications system 100 of any standard wherein the transmission power of at least a second transmission channel is set in dependence of the transmission power of a first transmission channel transmitted by the same node, or wherein the relation between the transmission powers of a first and at least a second transmission channels transmitted by the same node can be estimated.

In a mobile radio communications system 100 operating according to the WCDMA standard, in the following referred to as a WCDMA system 100, power control commands 225 (cf. FIG. 2) are transmitted from the base station 110 to the MS 105 in dependency of the received signal power of the DPCCH, $P_{DPCCH}$. (The received signal power of a transmission channel i in a mobile radio communications system 100 operating according to code division multiple access is often referred to as the Received Signal Code Power, RSCP). The MS 110 then adjusts the transmission power of all uplink transmission channels in dependence of the received power command 225. For the uplink transmission channels DPDCH, E-DPCCH, E-DPDCH and HS-DPDCH in a WDCMA system 100, the following relations hold:

$$P_{DPDCH} = A_D P_{DPCCH} \quad (2a)$$

$$P_{E\text{-}DPCCH} = A_{EC} P_{DPCCH} \quad (2b)$$

$$P_{E\text{-}DPDCH} = A_{ED} P_{DPCCH} \quad (2c)$$

$$P_{HS\text{-}DPDCH} = A_{HS} P_{DPCCH} \quad (2d),$$

where $P_{DPDCH}$, $P_{E\text{-}DPCCH}$, $P_{E\text{-}DPDCH}$, and $P_{HS\text{-}DPDCH}$ are the received signal powers on the DPDCH, E-DPCCH, E-DPDCH and HS-DPDCH, respectively. The scaling factors $A_D$, $A_{EC}$, $A_{ED}$ and $A_{HS}$ can be expressed in terms of the ratio of the gain β of the corresponding transmission channel to the gain $β_C$ of DPCCH, where for example $$A_D = \frac{β_D^2}{β_C^2},$$

etc, the gains $β_C$, $β_D$ etc being specified in e.g. 3GPP TS 25.213 v8.3.0. Generally, the received signal power $P_i$ of a transmission channel i can be expressed by the following relation:

$$P_i = A_i P_1 \quad (2e),$$

where $A_i$ is a scaling factor reflecting the ratio of the received signal power of transmission channel i to the received signal power of a first transmission channel. Hence, an estimate of the received signal power of the first transmission channel, denoted $\hat{P}_1^i$ and referred to as a channel specific estimator, or estimator, $\hat{P}_1^i$, can be obtained from a measurement of the received signal power on transmission channel i and an estimate $\hat{A}_i$ of the scaling factor $A_i$:

$$\hat{P}_1^i = \frac{P_i}{\hat{A}_i}, \quad (3a)$$

In a WCDMA system 100, the ratio of a gain $β_i$ to the gain $β_C$ for a transmission channel i is typically quantised, for example onto 4 bits, in which scenario the ratio could take one of 16 different values. The network side of WCDMA system 100 typically signals to the MS 110 which value of the scaling factor $A_i$ to use at transmission channel i for a particular transmission data rate. Different values of the scaling factor $A_i$ for the transmission channel i are typically signalled for different data rates on the transmission channel i. The MS 110 can then select an appropriate data rate depending on the data to be transmitted over the transmission channel i, and set the scaling factor $A_i$ accordingly. Although the network side of WCDMA system 100 knows which value of $A_i$ that the MS 110 will use for a particular data rate, the network side will normally not know which data rate, and hence which value of $A_i$, that has been used at the time when the received signal power is estimated. In case of speech being transmitted over the DPDCH, for example, the MS 110 would typically switch between using a higher value of the scaling factor $A_D$ when the user of the MS 110 is talking, and a smaller value of scaling factor $A_D$ for the time periods when the user is silent. Oftentimes, the higher transmission power for speech is comparatively low, and when interference levels in the cell are high, it might be difficult to distinguish the higher power from the lower power at the receiver side. Hence, a change of the characteristics of the data to be transmitted over a transmission channel i giving rise to a change of data rate represents an example of when the scaling factor $A_i$ changes during an ongoing transmission session. Another scenario which might give rise to a change in the scaling rate $A_i$ of a transmission channel i during a transmission session is when data is transmitted on the E-DPDCH and the maximum allowed overall transmitting power of the MS 110 has been reached, see TS 25.214 v.8.4.0, section 5.1.2.6 Yet another example of a situation when the scaling factors are unknown by the base station 105 is when the transmission rate of the MS 110 is limited by neighbouring base station(s) 105.

In a WCDMA system 100, an MS 110 would typically include information on the actual scaling factors in a control message, sent to the base station for example on the DPCCH. However, the decoding of such control message is typically slow, so that by the time the information has been decoded by the base station 110, the power command 225 should already have been transmitted to the MS 105. Hence, another means of obtaining a value of the scaling factors is required.

By predicting at least one of the current scaling factors $A_D$, $A_{EC}$, $A_{ED}$ and $A_{HS}$, and by utilizing this prediction in combination with a measured value of the received signal power of the transmission channel corresponding to the predicted at least one scaling factor, an improved estimate of the received signal power at the DPCCH channel can be obtained. Thereby, the uplink power control in a WCDMA system 100 can be achieved, resulting in improved performance of the WCDMA system 100.

In a communications system 100 utilizing Code Division Multiple Access, different transmission channels are typically achieved by the transmitting node spreading at least two sets of information by different channelization codes. In such a communications system 100, the power ratio of the different transmission channels stays the same throughout the transmission, since the different transmission channels are simultaneously transmitted over the same carrier frequency. In a TDMA system, it can in many scenarios be assumed that the power ratio of transmission channels which are transmitted on different time slots on the same carrier frequency is maintained during transmission, depending on the time difference between the time slots as compared to the time scale of the variation of transmitting conditions.

Figure 3:
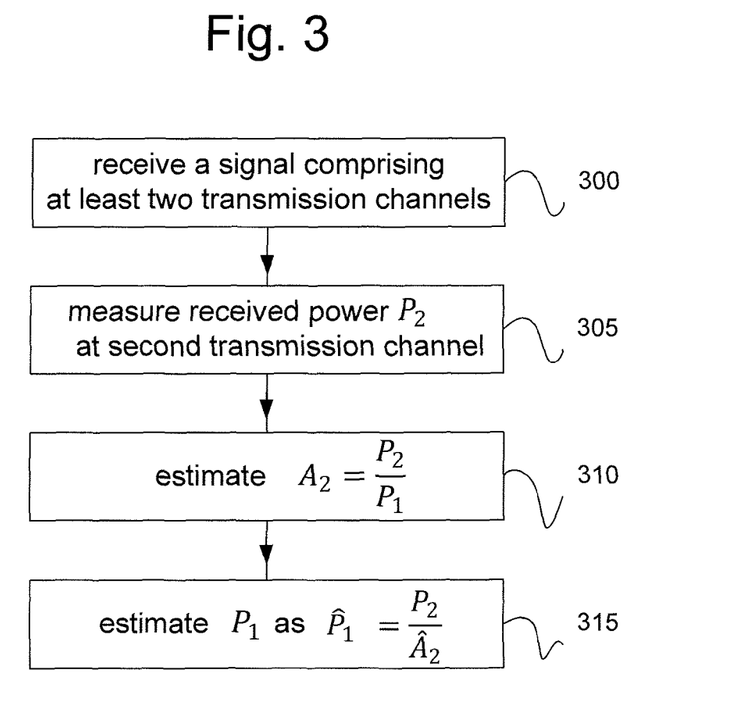
FIG. 3 is a flowchart illustrating a method of determining the received signal power of a transmission channel according to an embodiment of the invention.

FIG. 3 illustrates a method according to the present technology, wherein the received signal power of a first transmission channel can be estimated by using measurements of the received signal power of a second channel transmitted by the same node as the first transmission channel and received at the same time as the first transmission channel (where the term "at the same time" should be interpreted to mean within a time period similar to, or preferably shorter than, the time scale of significant changes in the transmission conditions on the transmission channels). At step 300 of FIG. 3, a signal comprising at least two transmission channels transmitted by the same node is received. In step 305, the received signal power of the second transmission channel, $P_2$, is measured. In step 310, the ratio $A_2$ of the transmission power of the second transmission channel to the transmission power of the first transmission channel, $P_1$, is estimated. Step 310 could alternatively be performed prior to, or at the same time as, step 305. In case the base station 105 already has knowledge of the scaling factor $A_2$, which could for example be the case in a communications system 100 where the scaling factor is signaled from the base station 105 to the MS 110, step 310 would be trivial. In step 315, the received signal power of the first transmission channel is estimated by use of the estimated ratio, $\hat{A}_2$, obtained in step 310 and the measured received signal on the second transmission channel, $P_2$, according to the following expression:

$$\hat{P}_1 = \frac{P_2}{\hat{A}_2} \quad (3b)$$

If the transmission power of the first channel is significantly lower than the transmission power of the second transmission channel, the transmission power $\hat{P}_1$ obtained from expression (3b) may be a better estimate of the true received signal power $P_1$ of the first channel than a measured value of the received signal power of the first transmission channel obtained in a conventional manner. In order to further improve the estimate $\hat{P}_1$ of $P_1$, power measurement of further transmission channels of the signal received in step 300 could advantageously be used. For example, a measurement of the received signal power of the first transmission channel could be used (for which channel the scaling factor $A_1$ equals 1), and/or power measurements of yet further transmission channels. This will be further discussed below in relation to FIG. 4.

The estimated value of the received signal power of the first transmission channel, $\hat{P}_1$, can advantageously be used in estimations of SIR on the first transmission channel, or in other applications. For example, accurate knowledge of the received signal power may also be beneficial for estimating the cell load.

Figure 4:
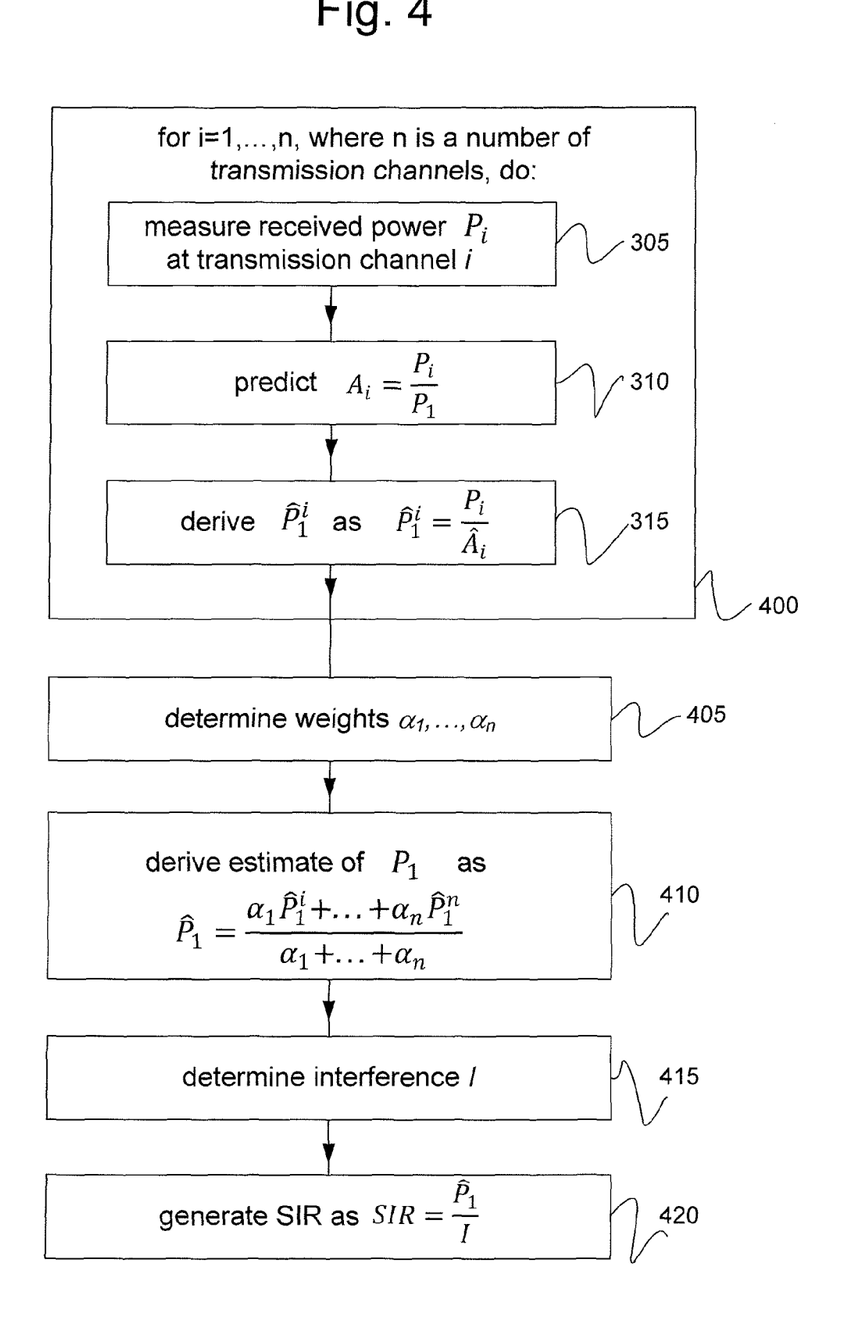
FIG. 4 is a flowchart illustrating a method of determining a signal-to-interference value according to an embodiment of the invention.

FIG. 4 illustrates a method of estimating SIR on a first transmission channel in a mobile radio communications system 100 wherein an estimate $\hat{P}_1$ of the received signal power of the first transmission channel is obtained by measuring the received signal power of n transmission channels and by estimating the corresponding n scaling factors $A_1, \ldots, A_n$. As discussed above, this could for example be very useful in the SIR estimation on the uplink DPCCH channel in a WCDMA system 100, wherein transmission channel 1 of FIG. 4 would be DPCCH. $\hat{P}_1$ would then be $\hat{P}_{DPCCH}$, etc. The transmission channels used in the estimation of $\hat{P}_{DPCCH}$ could then for example be DPCCH, DPDCH, E-DPCCH, E-DPDCH and HS-DPCCH, in which case the number n equals 5, or any subset of these or other transmission channels.

In the scenario illustrated in FIG. 4, a signal has already been received by a base station 105, the signal comprising information transmitted over at least n different transmission channels. In step 400, an estimate $\hat{P}_1^i$ of the received signal power of DPCCH is derived from each of the n transmission channels to be used in the estimation of $\hat{P}_1$, where $i=1, \ldots, n$. Step 400 of FIG. 4 is shown to comprise the steps 305, 310 and 315 (cf. FIG. 3), which are performed for each of the n transmission channels to be used in the estimation of $P_1$. In step 315 of FIG. 4, an estimate of the received signal power of the first channel, typically an estimator $\hat{P}_1^i$ as defined in expression (3a), is obtained from each of the transmission channels i, $i=1, \ldots, n$. After having performed the steps 305-315 for the n channels to be used, step 405 is entered, wherein a weight coefficient $\alpha_i$ is determined for each of the n channels, where $i=1, \ldots, n$. Step 415 is then entered, wherein an estimate $\hat{P}_1$ of the received signal power of the DPCCH is derived by use of the following expression:

$$\hat{P}_1 = \frac{\alpha_1 \hat{P}_1^1 + \ldots + \alpha_n \hat{P}_1^n}{\alpha_1 + \ldots + \alpha_n} \quad (4)$$

In step 415, the interference I to be used for estimating a SIR value on the first transmission channel is determined.

At step 420, an estimate of SIR on the first transmission channel is obtained by use of the following expression:

$$\hat{SIR} = \frac{\hat{P}_1}{I} \quad (5)$$

In FIG. 4, all or some of the steps 300-405 could be performed for one of the n transmission channels at a time, or a step could be performed for all n transmission channels before the next step is entered. Some steps could be performed simultaneously, step 310 could be performed prior to step 305, etc. In case the weight coefficients are static, step 405 could be omitted.

The interference l could be defined in any suitable manner. Often, the interference l denotes the combination of noise as well as interference from other transmitting nodes in communications system 100. The interference could for example be defined as the signal power of the entire received signal, less the measured received signal power of the first transmission channel, or as the signal power of the entire received signal less the estimated received signal power of the first transmission channel, $\hat{P}_1$. Other definitions of the interference l could alternatively be used.

The power control mechanism used for controlling the transmission power of an MS 110 should advantageously take into account any interference cancellation performed. The transmission power should be controlled so that the received signal is decodable after the interference cancellation has been performed, rather than aiming at decodability prior to interference cancellation. A SIR value used for uplink power control could advantageously be obtained by using a value of the remaining interference after interference cancellation, rather than the actual interference prior to interference cancellation.

Interference cancellation generally significantly improves the performance of a communications system. However, this improved performance comes at the expense of an increased decoding delay. Compared to systems which do not employ interference cancellation, the signal decoding is typically delayed by one or several Transmission Time Intervals (TTIs). For the decoding of data, this delay is generally acceptable. For the fast control of the uplink power, on the other hand, such a delay would typically cause severe problems. To measure SIR after interference cancellation for purposes of power control would typically result in a significant capacity decrease in the system, since the SIR value thus obtained would be old on the time-scale of variations in the received signal power. A SIR value thus obtained would therefore not be appropriate for control of the uplink transmission power.

In order to overcome this problem, a separation of the SIR estimation into two stages may be employed, wherein the received signal power is estimated prior to interference cancellation, while an estimate of the interference is based on the remaining interference after interference cancellation. The interference used to obtain such a SIR value could then be obtained from a signal received at an earlier point in time than the signal from which the received signal power is obtained. Interference variations are typically considerably slower than variations in the received signal power, and to use an estimate of the interference that reflects the interference at a slightly earlier point in time will generally provide a sufficiently good estimate of SIR.

Hence, if a base station 105 utilizes interference cancellation, the interference l determined at step 415 of FIG. 4 could advantageously be derived from signal(s) received at an earlier point in time. It is typically desirable to use the latest estimate of l available. In this situation, step 415 could be performed prior to, or simultaneously with, any of the steps 400-410.

In order to illustrate this, consider an implementation of the power control mechanism illustrated by signalling diagram of FIG. 2, at a time $t_j$ (the signals and events of FIG. 2 will in the following discussion be given an index in order to reflect the time aspect of the signalling, where the index j indicates a signal or event at time $t_j$, etc). At event 205j, the base station 110 detects an uplink signal 200j transmitted by the MS 110, and determines the received signal power $P_j$ of signal 200j. At event 210j, the base station 110 determines an interference value to be used for SIR estimation of the signal 200j. The interference value, here denoted $I_{j-d}$, is typically obtained from interference measurements of at least one previously received uplink signal 200 transmitted from the MS 110 at an earlier point in time. In this scenario, event 210j could alternatively be performed prior to, or simultaneously with, event 205j. At event 215j, the base station 110 determines a SIR value from the following relation:

$$SIR_j = \frac{P_j}{I_{j-d}}, \qquad (1a)$$

This value of $SIR_j$ will then be used at event 220j in order to determine whether the power command 225j should contain an instruction to increase or decrease the transmission power of the MS 110.

The estimated value $\hat{P}_1$ of the received signal power of the first transmission channel could be used for other purposes than determination of SIR, such as for example as an input to uplink load estimation. Steps 415 and 420 could then be omitted from the flowchart of FIG. 4.

By the method illustrated in FIG. 4, the accuracy of the estimated value of the received signal power of a first transmission can be greatly improved. Since the accuracy of such an estimate is crucial for many aspects of the control of a mobile radio communications system 100, the performance of a mobile radio communications system 100 applying the method can be greatly improved.

Determining the Scaling Factors

The estimation of the ratio $A_i$ of the received signal power of a first channel (e.g. DPCCH) to the received signal power of a transmission channel i, also referred to as the scaling factor of the transmission channel i, can be made in different ways. As mentioned above, if the ratio $A_i$ is already known by the receiving node, the estimation would be trivial and the estimate $\hat{A}_i$ would be set to the known value. However, in many situations, it is the transmitting node that sets the ratio $A_i$, and then the ratio $A_i$ would typically not be known by the receiving node at the time of estimating the received signal power. However, the value of the scaling factor $A_i$ used by the transmitting node at a particular time of transmission is typically signaled from the transmitting node to the receiving node. As explained above, this value of the scaling factor $A_i$ can often be decoded only after the estimation of the received signal power has already been made. However, known values of the scaling factor $A_i$ for previous points in time could advantageously be used for predicting the value of $A_i$ at the point in time for which the received signal power is to be estimated. Such prediction could for example be made by assuming that the value of the scaling factor $A_i$ has not changed since a point in time for which the receiving node knows the value of the scaling factor $A_i$. The estimate $\hat{A}_i$ of the scaling factor $A_i$ would then be obtained according to the following:

$$\hat{A}_{i,j} = A_{i,p} \qquad (6),$$

where the index i indicates transmission channel i, i=1, ..., n; the index j indicates the point in time for which the estimation of the received power is to be made and p indicates the previous point in time for which the value of the ratio $A_i$ is known. Preferably, the point in time p should be the latest point in time for which the value of the scaling factor $A_i$ is known. In many scenarios, the accuracy of the prediction according to expression (6), i.e. that $A_i$ has not changed since the last known value, is rather good, depending mostly on the type of data transmitted over transmission channel i. For example, when transmission channel i is used for speech, the value of $A_i$ depends on whether the user is talking or not. The length of a talk burst is typically several seconds, while the estimation of the received signal power is typically repeated on a time scale of milliseconds or shorter. Thus, the prediction according to expression (6) could have an accuracy of over 99%.

Other ways of using known values of the scaling factor $A_i$ at previous points in time in order to obtain the estimate $\hat{A}_i$ of the scaling factor could alternatively be used. For example, it may be that the value of the scaling factor $A_i$ often changes in the same manner over time, so that a pattern in a series of $A_{i,t}$-values can be discerned over time, where the index t indicates time, t=j−1, j−2, .... This could for example be the case if the transmission rate often slows down in the same way (e.g. over two or more TTIs), and the ratio $A_i$ is reduced according to a known pattern. A variation in time of the known values of $A_i$ for previous points in time could then be used to predict that the value of $A_{i,j}$ will follow the known pattern. A histogram of past values of the scaling factor $A_i$ could also be used, where histogram indicates the relative occurrence of different values of a scaling factor $A_{i,j}$. One possible prediction could be to set the value of the scaling factor to the most often occurring value of the scaling factor $A_{i,j}$ in the histogram.

Other means of estimating the scaling factors $A_1, \ldots, A_n$ could be used. For example, in a mobile radio communications system 100 wherein the scaling factor $A_i$ of a transmission channel i could only take certain values, the received signal power of the first transmission channel, i.e. the transmission channel for which the received signal power is to be derived in steps 315 and 410, could be measured. An approximation $A_i^{approx}$ of the scaling factor for transmission channel i could then e.g. be obtained as the ratio of the measured received signal power of the $i^{th}$ channel to the measured received signal power of the first transmission channel. The estimated value of the scaling factor, $\hat{A}_i$, could then be selected as the allowed value of $A_i$ which is closest to $A_i^{approx}$. In cases where additional restrictions of the transmission power on a transmission channel i can be set, so that not all of the available values of the ratio $A_i$ may be used, information on any such additional transmission power limitation should preferably be taken into account when selecting an estimated value of the scaling factor $A_i$. For example, in a WCDMA system 100, the scheduler on the network side of the system 100 may signal to the MS 110 that only some of the available values of $A_i$ may be used. To set the estimated value of $A_i$ to a value which was not allowed at the time of transmission should then be avoided.

Although the estimate of a scaling factor $A_{i,j}$ of a transmission channel i could in some scenarios be rather inaccurate at a particular point in time $t_j$, for example at the moment following a data rate change, the likelihood of the scaling factor of all n channels used for the estimation of $\hat{P}_1$ being inaccurate at the same point in time is rather small. In order to minimise the effects of inaccuracy in the values of $A_i$, as well as in the measurement values $P_i$, dynamic allocation of values to the weight coefficients $\alpha_1, \ldots, \alpha_n$ may advantageously be employed.

Determining the Weight Coefficients

When the received signal power of more than one transmission channel is used for deriving the estimate of the received signal power of the first channel, $\hat{P}_1$, the different weights $\alpha_i$ given to the different transmission channels (cf. expression (4)) can preferably be updated on a regular basis, for example each time a new value of $\hat{P}_1$ is to be determined. Different methods of determining the weight coefficients may be used. Advantageously, the value of a weight coefficient $\alpha_i$ should be set to reflect the uncertainty of the corresponding estimator $\hat{P}_1^i$. Since each value of $\hat{P}_1^i$ is based on a power measurement of a noisy signal and on a potentially uncertain estimation of the scaling factor $A_i$, the accuracy of an estimator $\hat{P}_1^i$ is determined both by the measurement accuracy of the measurement of the power $\hat{P}_1^i$ and the estimation accuracy of the $A_i$ estimation.

Figure 5:
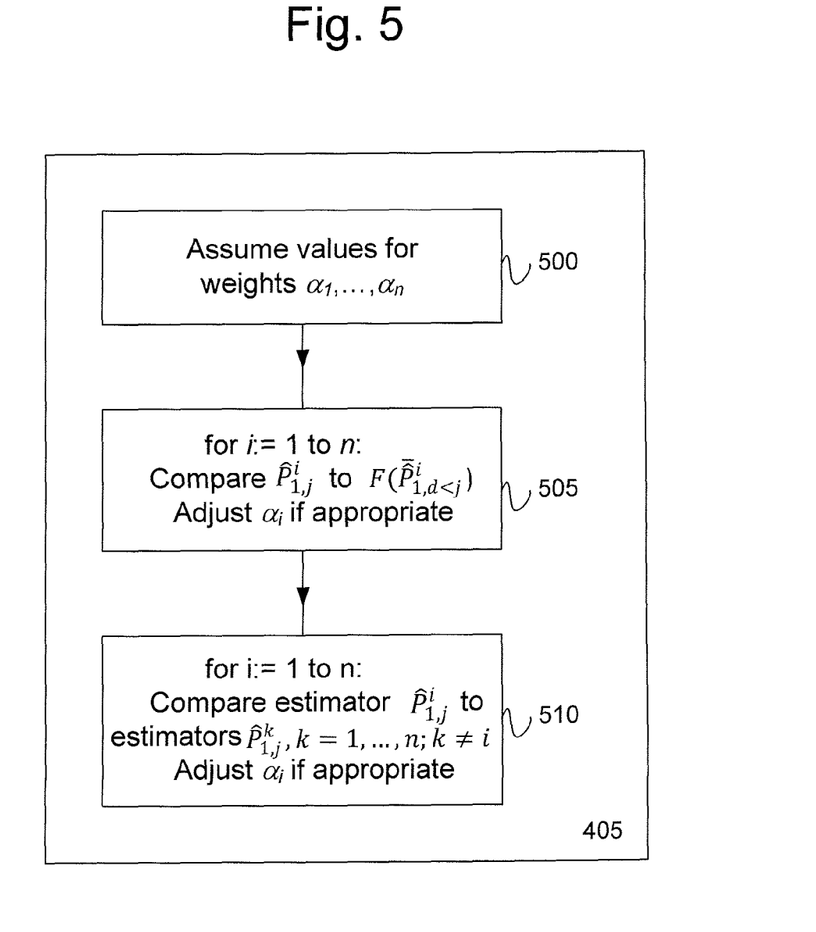
FIG. 5 is a flowchart illustrating a method of determining weight coefficients for different channel specific estimates used in determining the received power of a transmission channel.

A flowchart illustrating a method of performing step 405 of determining the weight coefficients $\alpha_1, \ldots, \alpha_n$ is shown in FIG. 5. In step 500, values are assumed for the weight coefficients $\alpha_1, \ldots, \alpha_n$. The value of a weight coefficient $\alpha_i$ assumed in step 500 could advantageously reflect the accuracy of the measurement of the received signal power $P_i$. Generally, the larger the received signal power at a transmission channel i, the better the accuracy of the measurement. It will now be shown that, under ideal conditions, the squared value of the scaling factor $A_i$ provides a good value for the weight coefficient $\alpha_i$.

Assuming that the scaling factors $A_i$ are known and true, consider the following expression for the measured value $P_i$ of the received signal power of a channel i:

$$P_i = A_i \cdot P_1^{true} + e_i \quad i = 1, \ldots, n \tag{7}$$

where $P_1^{true}$ is the true value of the received signal power of the first transmission channel and $e_i$ represents the measurement error on channel i. In expression (7) the measured powers are considered as a linear regression with respect to the scaling factors $A_i$. In vector format this can be written as:

$$\overline{P} = \overline{A} P_1^{true} + \overline{e} \tag{8}$$

where $\overline{P}, \overline{A}$ and $\overline{e}$ are column vectors with elements $P_i, A_i$ and $e_i$, respectively. For the case where the measurement errors $e_i$ are correlated, the received signal power estimate of the first channel is given by the general expression:

$$\hat{P}_1 = \frac{\overline{A}^T \cdot C^{-1} \cdot \overline{P}}{\overline{A}^T \cdot C^{-1} \cdot \overline{A}}, \tag{9}$$

where C is the covariance matrix of the measurement errors. Assuming that the measurements are bias-free (the expectation of the error $e_i$ is zero) and the correlations between measurement errors on different channels are zero, then covariance matrix C is a diagonal matrix whose elements are the variances $\sigma_i^2$ of the errors $e_i$: $C = \text{diag}(\sigma_1^2, \ldots, \sigma_n^2)$. A Linear Least Squares estimate $\hat{P}_1$ of the true first transmission channel power is then given by $$\hat{P}_1 = \frac{\overline{A}^T \cdot C^{-1} \cdot \overline{P}}{\overline{A}^T \cdot C^{-1} \cdot \overline{A}} = \frac{\sum_{i=1}^n A_i P_i / \sigma_i^2}{\sum_{i=1}^n A_i^2 / \sigma_i^2} = \frac{\sum_{i=1}^n A_i^2 \cdot (P_i / A_i) / \sigma_i^2}{\sum_{i=1}^n A_i^2 / \sigma_i^2}. \tag{10}$$

Thus, as already indicated in expression (4) above, the estimate of the received signal power of the first transmission channel, $\hat{P}_1$, can be written as the convex combination of the n channel specific estimators $\hat{P}_1^i$:

$$\hat{P}_1 = \sum_{i=1}^n w_i \hat{P}_1^i \tag{11}$$

wherein a normalised weight $w_i$ is given by:

$$w_i = \frac{\alpha_i}{\sum_{i=1}^n \alpha_i} = \frac{A_i^2 / \sigma_i^2}{\sum_{i=1}^n A_i^2 / \sigma_i^2}, \tag{12}$$

As a special case, if the measurement variance is the same for all channels, i.e. $\sigma_i^2 = \sigma^2$, then a normalised weight $w_i$, and hence the corresponding weight coefficient $\alpha_i$, is proportional to the squared scaling factor $A_i^2$:

$$w_i \propto \alpha_i \propto A_i^2 \tag{13a}$$

Hence, when the accuracy of the estimates of the scaling factors is good, the weight coefficients could advantageously be set so that a weight coefficient $\alpha_i$ is proportional to the square of the estimate $\hat{A}_i$ of the corresponding scaling factor $A_i$.

However, when the accuracy of some or all of the estimated scaling factors is low, it may be advantageous to use other means of determining the value of the weight coefficients than by means of expression (13a). For example, the value of the weight coefficients could for example be set in accordance with the following expression:

$$w_i \propto \alpha_i \propto \frac{1}{\sigma_i^2}, \tag{13b}$$

so that a weight coefficient $\alpha_i$ is proportional to the inverse of the variance $\sigma_i^2$ of the measured power $P_i$, where the variance $\sigma_i^2$ can for example be determined as the empirical variance according to known methods. The meaning of the variance $\sigma_i^2$ can in this situation be extended from including the power measurement error only, to also include the uncertainty in the prediction of the scaling factor, so that the variance $\sigma_i^2$ of expression (13b) is the variance of the channel specific estimator, $\hat{P}_{1,j}^i$. If it can be detected for which transmission channel (or transmission channels) that the prediction of the scaling factor is unreliable, the weight coefficients corresponding to the more reliable scaling factors could be determined according to expression (13a), while weight coefficients corresponding to less reliable scaling factors could be determined in accordance with expression (13b). Alternatively, weight coefficients could generally be determined according to expression (12), so that a weight coefficient is proportional to the squared estimate of the corresponding scaling factor, as well as to the inverse of the corresponding variance.

Now returning to FIG. 5, in step 505, the current value of the estimator $\hat{P}_{1,j}^i$ (obtained at time $t_j$) is compared to recently obtained values of $\hat{P}_1^i$. A value of the estimator $\hat{P}_{1,j}^i$ that differs from recent values of $\hat{P}_1^i$ may indicate that the data rate at the transmission channel i has been changed and that the scaling factor estimate $\hat{A}_i$ has not yet been updated accordingly, or that the conditions for measuring $P_i$ have changed. In step 505, the value of estimator $\hat{P}_{1,j}^i$ is compared to a function $F(\bar{P}_{1,d<j}^i)$ of historic values of $\hat{P}_1^i$. The bar above the $\bar{P}$ indicates that the function might depend on more than one historic value of $\hat{P}_1^i$, such historic values obtained at different times $t_d$, where $t_d<t_1$. However, $F(\bar{P}_{1,d<j}^i)$ may very well be a function of only one value of $\hat{P}_1^i$ obtained at a time $t_d$, where the time $t_d$ could for example be the time at which the last value of $\hat{P}_1^i$ was obtained, $t_d=t_{j-1}$. The function $F(\bar{P}_{1,d<j}^i)$ could then advantageously take the value:

$$F=\hat{P}_{1,j-1}^i \tag{14},$$

In this case, the comparison made in step 505 could for example involve the following expression:

$$\frac{|\hat{P}_{1,j}^i - \hat{P}_{1,j-1}^i|}{\hat{P}_{1,j}^i} < T_i, \tag{15}$$

where $T_i$ is a threshold value indicating a time variation tolerance for the transmission channel i. If the comparison of expression (15) shows that the relative change of estimator $\hat{P}_1^i$ is larger than $T_i$, then the weight coefficient $\alpha_i$ should be reduced. Other comparisons than that of expression (15) could be used, in particular when expressions different to that of expression (14) is used for the function F.

In step 510 of FIG. 5, the value of the estimator $\hat{P}_1^i$ obtained at time $t_j$ (denoted $\hat{P}_{1,j}^i$) is compared to estimators $\hat{P}_{1,j}^k$ obtained from measurements at time $t_j$ on other transmission channels k, where k can take values k=1, ..., n; k≠i. If the comparison of step 510 shows that an estimator $\hat{P}_{1,j}^i$ differs significantly from the majority of the other estimators $\hat{P}_{1,j}^k$, the weight coefficient $\alpha_i$ could advantageously be reduced.

The comparison could for example include a check to see if any of the data points $(A_i, P_i)$ deviates significantly from the regression line expressed by expression (7).

A regression line used for this test can be based either on the most recent estimates of $P_1$, and/or on one or more historic estimates of $P_1$, which are typically used to obtain a value G representing the expected slope of the line. The value G could be set to the last estimate of $P_1$, or it could for example be a filtered value: $G_j=q·P_{1,j-1}(1-q)·G_{t-1}$, wherein $G_j$ is the value of G at time $t_j$ and $0\leq q\leq 1$. The deviation for channel i from the regression line is regarded as significant at time $t_j$ if $$|\hat{P}_{1,j}^i - G_j| > \frac{k\sigma_i}{\hat{A}_{i,j}}, \tag{16}$$

where $\sigma_i$ is the (estimated) standard deviation of the measured power $P_i$. The factor k could typically be chosen to be in the range 2-4, but other values could be contemplated, and the value of the factor k could be chosen to optimize the estimation of $P_1$ with respect to uncertainties in the scaling factor $A_i$.

When it has been found in step 505 or 510 that a weight coefficient $\alpha_i$ should be adjusted, this could be done in different ways. For example, a weight coefficient $\alpha_i$ corresponding to an estimator $\hat{P}_1^i$ which in step 505 or 510 has been found to be deviating could be set to zero, resulting in a complete removal of the deviating estimator $\hat{P}_1^i$ from the calculation of the first transmission channel received signal power $\hat{P}_1$, or the weight coefficient $\alpha_i$ could be reduced by an amount reflecting the magnitude of the deviation from an expected value of $\hat{P}_1^i$. Alternatively, the weight coefficients corresponding to transmission channels for which the accuracy has proved to be good could be increased. For example, the weight coefficients $\alpha_1, \ldots, \alpha_n$ could be divided by the squared deviation from a regression line fitted to the data points $(A_i, P_i)$ (cf. expression (7)).

In FIG. 5, the step 505 and/or step 510 may be omitted. However, the accuracy of the estimated value of the first transmission channel received signal power will generally be improved by performing step 505 and/or step 510. In a mobile radio communications system 100 where the weight coefficients $\alpha_1, \ldots, \alpha_n$ are static, entire step 405 could be omitted.

Figure 6:
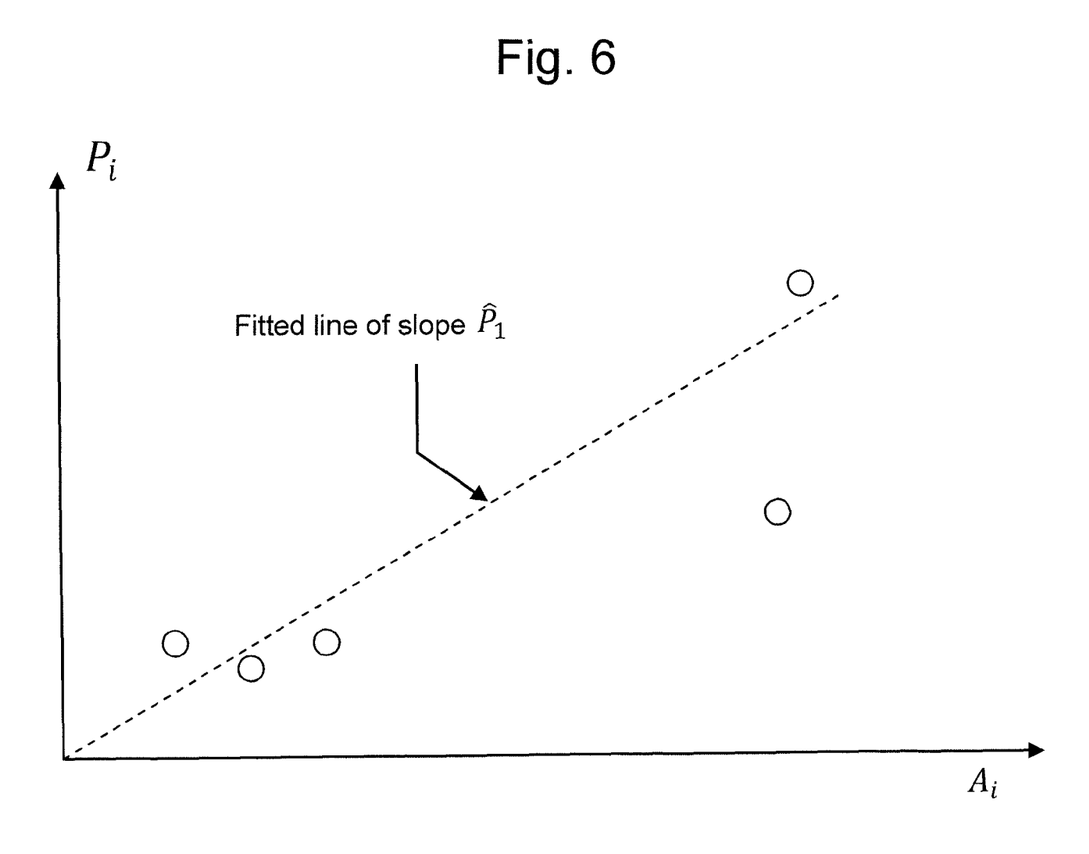
FIG. 6 shows an example of linear regression performed for a set of data points representing different channel specific estimates.

FIG. 6 illustrates measurements of the received signal power $P_i$ of n different transmission channels at a particular point in time, wherein the measurements have been plotted as a function of the values of the scaling factor, $A_i$. In the plot shown in FIG. 6, n=5. Under the assumption that the scaling factors $A_i$ are known or can be estimated at sufficient accuracy, the received signal power of the first transmission channel, $\hat{P}_1$, can be obtained from the plot as the slope of a linear curve fitted to the data points $(A_i, P_i)$, cf. expression (7).

Figure 7:
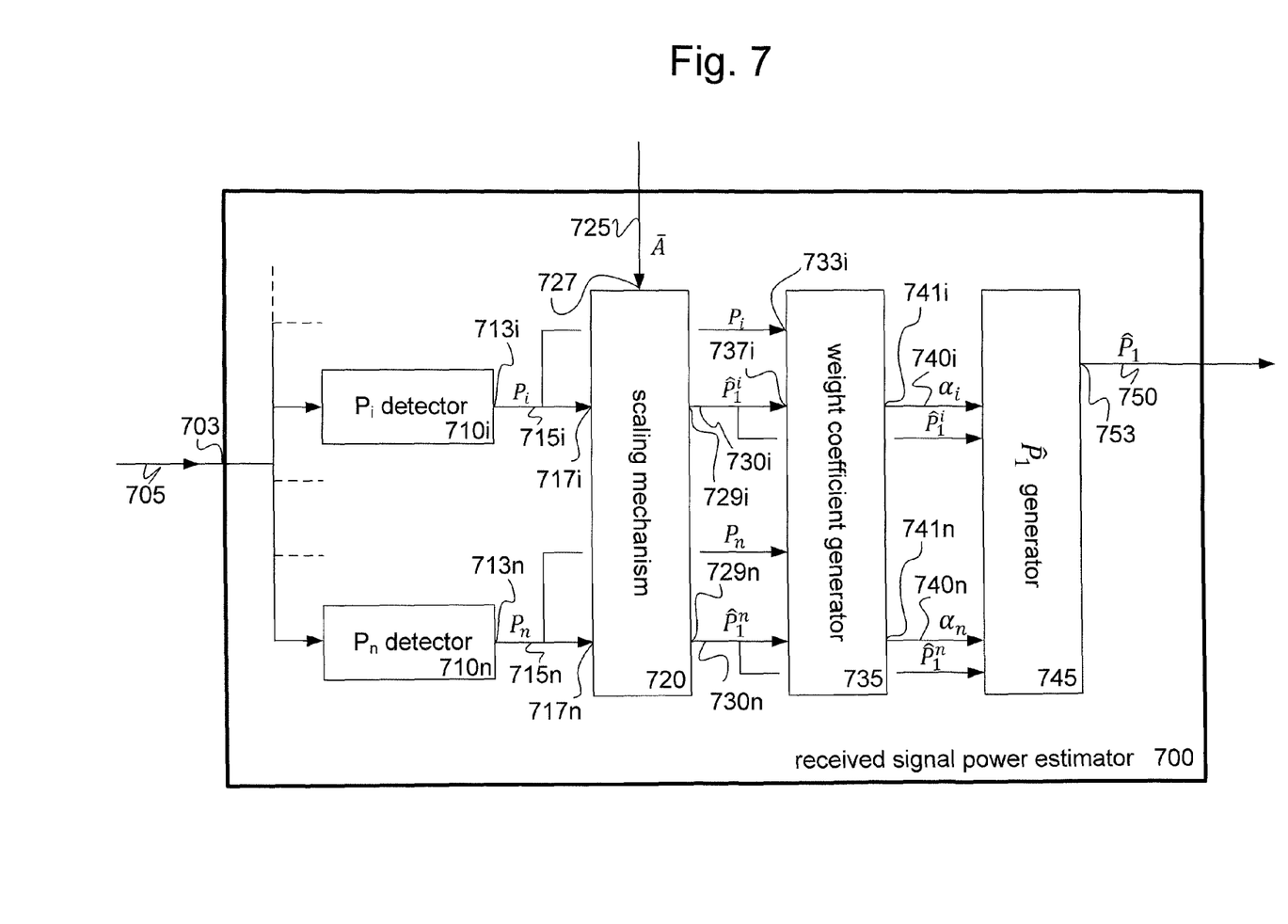
FIG. 7 is a schematic illustration of a received signal power estimator according to an embodiment of the invention.

FIG. 7 illustrates a received signal power estimator 700 according to an embodiment of the present technology. Received signal power estimator 700 comprises an input 703 for receiving a signal 705 comprising information transmitted over at least two transmission channels. Input 703 is connected to a set of n received signal power detectors, or $P_i$-detectors, 710$_1$-710$_n$, each adapted to measure the received signal power of a transmission channel i. A $P_i$-detector 710$_i$ is further adapted to deliver, at a $P_i$-detector output 713i, a signal 715i indicative of the measured transmission power $P_i$ of transmission channel i. A $P_i$-detector 710i could operate according to known principles of received signal power detection.

An output 713i of a $P_i$-detector 710i is connected to an input 717i of a scaling mechanism 720, the scaling mechanism 720 being adapted to receive n signals $715_1$-$715_n$. The scaling mechanism 720 is further adapted to receive a signal 725 at an input 727, the signal 725 being indicative of a set of scaling factors $A_i, \ldots, A_n$ (this information being denoted $\overline{A}$ in FIG. 7). The set of scaling factors of which the signal 725 is indicate could typically be a set of scaling factors used at the transmission of a signal 705 received at an earlier point in time, or a the set of scaling factors actually used at the point in time that the present signal 705 was transmitted, if the scaling factors are known by the receiving node of which the received signal power estimator 700 forms a part. Scaling mechanism 720 could be further adapted to receive other information relating to the value of the scaling factors $A_1, \ldots, A_n$, such as a maximum value of the scaling factor signalled to the transmitting node as discussed above.

The scaling mechanism 720 is further adapted to use a signal 715$i$, together with information on the scaling factor $A_i$ received in signal 725, in order to obtain a value of a channel specific estimator $\hat{P}_1^i$. The scaling factor mechanism 720 could for example include a scaling factor predictor, not shown, adapted to predict the present value of the scaling factors $A_i, \ldots, A_n$ as described above. Scaling factor mechanism 720 is further adapted to perform the operation of expression (3a), by which values of channel specific estimators $\hat{P}_1^1, \ldots, \hat{P}_1^n$ can be obtained. Scaling factor mechanism 720 comprises outputs $729_1$-$729_n$, adapted to deliver signals $730_1$-$730_n$ indicative of the value of the estimators $\hat{P}_1^1, \ldots, \hat{P}_1^n$, respectively.

The output 713$i$ of a $P_i$-detector 705$i$ is further connected to an input 733$i$ of a weight coefficient generator 735, the weight coefficient generator 735 being adapted to receive n signals $715_1$-$715_n$. The weight coefficient generator 735 could further, or alternatively, be adapted to receive, from the $P_i$-detector 710$i$, a signal indicative of the variance $\sigma_i^2$ of the measurement error $e_i$ of the measurement by which the value of $P_i$ was obtained. The weight coefficient generator 735 is further adapted to assume values of weight coefficients $\alpha_1, \ldots, \alpha_n$ in dependence on the information received from the $P_i$-detectors 710$i$-710$n$, for example by performing the operation of expression (13a) or (13b).

In FIG. 7, the weight coefficient generator 735 is further connected to the outputs $729_1$-$729_n$ of the scaling mechanism 720, and adapted to receive signals $730_1$-$730_n$ at inputs $737_1$-$737_n$. The weight coefficient generator 735 of FIG. 7 is adapted to compare a value of an estimator $\hat{P}_1^i$ received from the scaling mechanism 720 to estimators $\hat{P}_1^k$, $k \neq 1$, and/or to values of estimator $\hat{P}_1^i$ relating to previous points in time, and to adjust the assumed values of the weight coefficients if the comparison(s) so indicate (cf. steps 505 and 510 of FIG. 5).

The weight coefficient generator 735 is adapted to generate an output indicative of the weight coefficients $\alpha_1, \ldots, \alpha_n$ generated by weight coefficient generator 735. This is illustrated in FIG. 7 by output signals $740_1$-$740_n$, each indicative of a weight coefficient $\alpha_i$ and delivered at an output 741$i$ of the weight coefficient generator 735.

An output 741$i$ of weight coefficient generator 735 is connected to a first-transmission-channel received signal power estimate generator, or $\hat{P}_1$-generator, 745, the $\hat{P}_1$-generator 745 being adapted to receive n signals $740_1$-$740_n$. The $\hat{P}_1$-generator 745 is further adapted to receive n signals $730_1$-$730_n$, each being indicative of a channel specific estimator $\hat{P}_1^i$. The $\hat{P}_1$-generator 745 is adapted to generate an estimate of the received signal power of the first channel, $\hat{P}_1$, by performing the operation of expression (4) on the information signalled in signals $730_1$-$730_n$ and $740_1$-$740_n$. The $\hat{P}_1$-generator 745 is further adapted to deliver a signal 750 indicative of the thus generated estimate of the received signal power of the first transmission channel, $\hat{P}_1$, at an output 753.

The received signal power estimator 700 of FIG. 7 could be altered in many ways. For example, the signals 730$i$ sent to the $\hat{P}_1$-generator 745 could be signalled via the weight coefficient generator 735, so that the direct connection between the $\hat{P}_1$-generator 745 and the scaling mechanism could be omitted. Similarly, the direct connection between the $P_i$-detector 710$i$ and the weight coefficient generator 735 could be omitted. In one embodiment, the connection between the scaling mechanism 720 and the weight coefficient generator 735, upon which signals 730$i$ are sent, could be omitted, corresponding to omitting steps 505 and 510 from the method of FIG. 5. In an embodiment where only one estimator $\hat{P}_1^i$ is used in the generation of $\hat{P}_1$ (cf. FIG. 3), the weight coefficient generator 735 as well as the $\hat{P}_1$-generator 745 could be omitted, and it would be sufficient for received signal power estimator 700 to comprise only one $P_i$-detector 705$i$. In other embodiments, the plurality of $P_i$-detector 705$i$ shown in FIG. 7 could be implemented as one $P_i$-detector 705$i$ capable of determining the received signal power of more than one transmission channel within the time span available for received signal power determination. Inputs $717_1$-$717_n$ of FIG. 7 could use the same or different physical inputs. The same applies to outputs $729_1$-$729_n$, inputs $737_1$-$737_n$ etc.

Figure 8:
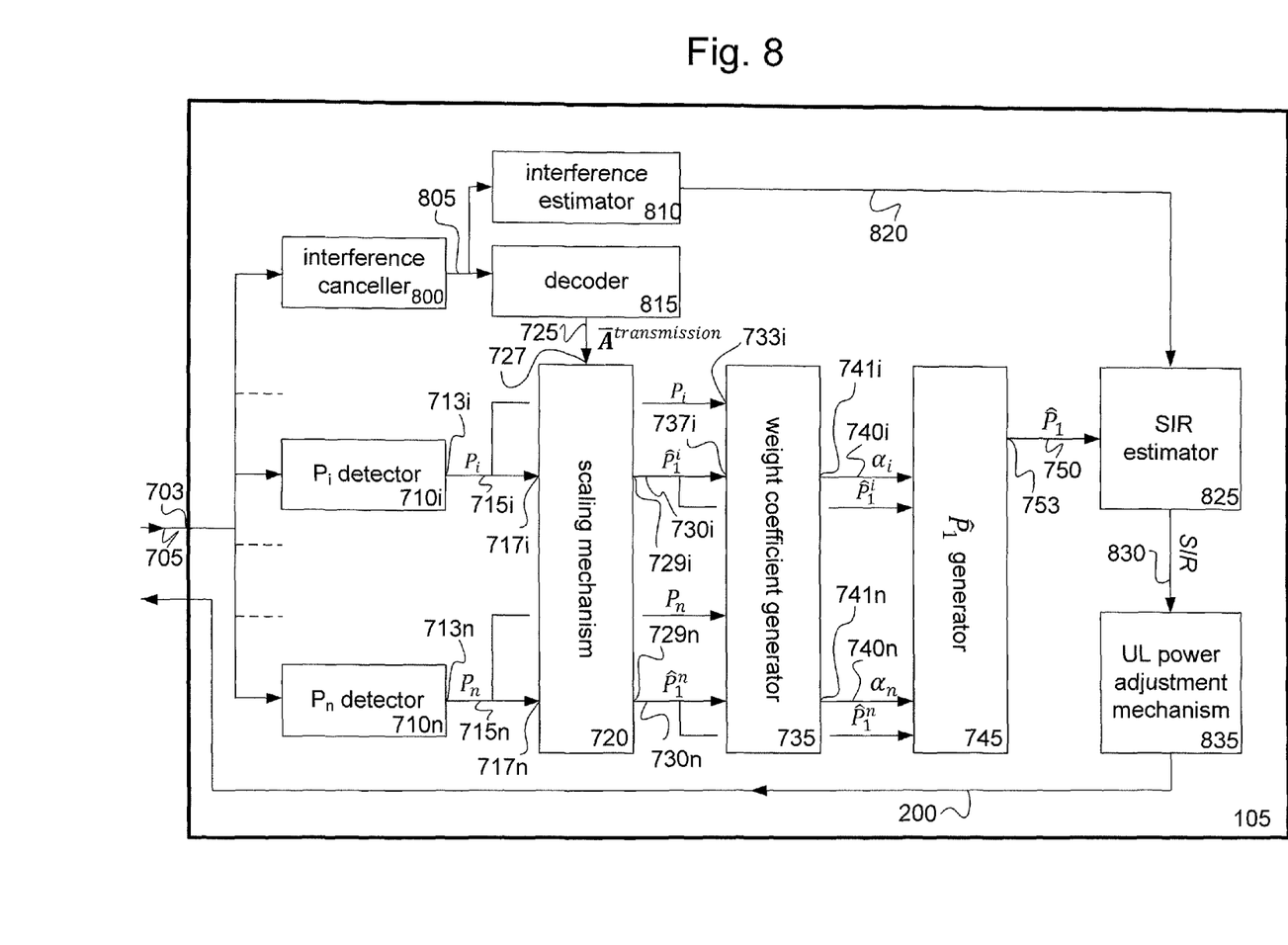
FIG. 8 is a schematic illustration of a radio base station employing interference cancellation wherein a received signal power estimator according to an embodiment of the invention has been implemented.

In FIG. 8, an example is illustrated of a received signal power estimator 700 being implemented in a base station 105 employing interference cancellation. The base station 105 comprises the features of received signal power estimator 700 of FIG. 7. The input 703 of FIG. 8 is further connected to an interference canceller 800, adapted to cancel at least some of the interference in signal 705. The interference canceller 800 is then adapted to feed the interference cancelled signal 805 is to an interference estimator 810 as well as to a decoder 815. The decoder 815 is adapted to retrieve information encoded into signal 705, for example any information on scaling factors $A_i$ used by the transmission node, MS 110. The decoder 815 of FIG. 8 is further adapted to generate a signal 725, indicative of such decoded information on scaling factors, and send this signal 725 to the scaling mechanism 720. Due to the delay in interference canceller 800, this signal 725 will typically be received by the scaling mechanism 720 when the signals 715$i$ to which the signal 725 relates have already been processed by scaling mechanism 720. However, the information in signal 725 can be used for predicting future values of the scaling factors, as discussed above.

The interference estimator 810 is adapted to estimate any remaining interference in the interference cancelled signal 805, and to generate a signal 820 indicative of this remaining interference. Interference estimator 810 is further adapted to feed this signal to a SIR estimator 825. SIR estimator 825 is further connected to the output of the received signal power estimator 700 via output 753, and will thus receive any estimate of $\hat{P}_1$ generated by $\hat{P}_1$-generator 745. SIR estimator 825 is adapted to generate a SIR-estimate based on the signals 750 and 820, and to feed a signal 830 indicative of this SIR-estimate to an uplink power adjustment mechanism 835. Uplink power adjustment mechanism 835 is adapted to determine, based on the SIR estimate of signal 830, whether the transmission power of the MS 110 should be increased or decreased (cf. event 220 of FIG. 2). The uplink power adjustment mechanism 835 is adapted to generate a power command 200 and feed this power command to the output of the base station 105 for delivery to the MS 110.

The received signal power estimator 700 could advantageously be implemented also in other devices, such as in an MS 110, or in other nodes where an accurate value of the received signal power is desired. Although the above description has mainly been made in terms of estimating the received signal power of the uplink, where the estimate of the received signal power of the first channel, $\hat{P}_1$, is generated by the base station 105, the same method can be used on the downlink, where the MS 110 could measure the received signal power of a second downlink transmission channel, and use this measured signal power in determining the received signal power of a first downlink transmission channel.

The features of received signal power estimator 700 could advantageously be implemented as a suitable combination of hardware and software. For example, scaling mechanism 720, weight coefficient generator 735 and $\hat{P}_1$-generator 745 could for example be implemented as software which, when run on a processor in a receiving node, would execute the operations described above. A receiving node, such as for example a radio base station 105, advantageously comprises a processor on which such software may be executed, and memory 120 on which such computer programs may be stored.

In the above description, the present invention has been described in terms of a mobile radio communications system 100 wherein the transmission power of at least a second transmission channel is set in dependence on the transmission power by way of proportionality. However, the invention would be equally applicable to communications systems 100 wherein the dependency of the transmission power of the at least a second transmission channel is dependent on the transmission power of the first transmission channel by way of any other relationship. Furthermore, the invention has mainly been described in terms of code division multiple access. However, it may also be applied to mobile radio communications systems 100 using other access methods, such as time division multiple access.

One skilled in the art will appreciate that the present invention is not limited to the embodiments disclosed in the accompanying drawings and the foregoing detailed description, which are presented for purposes of illustration only, but it can be implemented in a number of different ways, and it is defined by the following claims.

The invention claimed is:

1. A method of estimating a received uplink signal power of a first transmission channel at a receiving node in a communications system, wherein the receiving node is a base station, wherein a received signal comprises information transmitted by a transmitting node over at least two transmission channels, wherein the transmitting node is a mobile station, the method comprising:
measuring the received uplink signal power of a second of the at least two transmission channels;
estimating a relationship between the transmission power of the second transmission channel and the transmission power of the first transmission channel; and
estimating the received uplink signal power of the first transmission channel using the measurement of the received uplink signal power of the second transmission channel and said estimated relationship;
measuring the received uplink signal power of at least one further transmission channel;
estimating a relationship between the transmission power of the further transmission channel to the transmission power of the first transmission channel; and
wherein estimating the received uplink signal power of the first transmission channel further comprises using the received uplink signal power of the at least one further transmission channel and the at least one estimated relationship between the transmission power of the first and further transmission channels.

2. The method of claim 1, further comprising
measuring the received uplink signal power of the first transmission channel; and wherein
estimating the received uplink signal power of the first transmission channel further comprises using the measured received uplink signal power of the first transmission channel.

3. The method of claim 1, wherein
the receiving node employs interference cancellation; and
the measurement(s) of received uplink signal power is performed prior to interference cancellation.

4. A method of estimating a received uplink signal power of a first transmission channel at a receiving node in a communications system, wherein the receiving node is a base station, wherein a received signal comprises information transmitted by a transmitting node over at least two transmission channels, wherein the transmitting node is a mobile station, the method comprising:
measuring the received uplink signal power of a second of the at least two transmission channels;
estimating a relationship between the transmission power of the second transmission channel and the transmission power of the first transmission channel; and
estimating the received uplink signal power of the first transmission channel using the measurement of the received uplink signal power of the second transmission channel and said estimated relationship;
wherein
estimating a relationship comprises estimating the ratio of the transmission power of the second or further transmission channel to the transmission power of the first transmission channel, thereby obtaining a scaling factor of the second or further transmission channel; and
estimating the received uplink signal power of the first transmission channel is performed by applying said scaling factor of the second or further transmission channel to the measured value of the received uplink signal power of said second or further transmission channel, thereby obtaining a channel specific estimator of said second or further transmission channel, and by estimating the received uplink signal power of the first transmission channel in dependence on said channel specific estimator.

5. The method of claim 4, further comprising
receiving, from the transmitting node, the ratio of the transmission power of the second or further transmission channel to the transmission power on the first transmission channel at at least one previous point in time; and
determining the scaling factor of said second or further transmission channel in dependence on said ratio at at least one previous point in time.

6. The method of claim 4, wherein the ratio of the transmission power on the first and second transmission channels can only take a limited number of values, and wherein
estimating the ratio comprises determining the ratio of the measured value of the received uplink signal power of the second or further transmission channels to the measured value of the received uplink signal power of the first transmission channel;
comparing said determined ratio of the measured values to the limited number of values that the ratio of the transmission powers can take; and
estimating the ratio as the one of the limited number of values that best corresponds to the determined ratio.

7. The method of claim 4, further comprising:
determining a weight coefficient for a channel specific estimator used in estimating the received uplink signal power of the first transmission channel, the weight coefficient reflecting the reliability of the channel specific estimator; and wherein
the estimation of the received uplink signal power of the first transmission channel is performed in dependence on said weight coefficient.

8. The method of claim 7, wherein
said determining a weight coefficient includes at least initially assuming that the weight coefficient is proportional to the square of the scaling factor by use of which the channel specific estimator has been obtained.

9. The method of claim 7, wherein
said determining a weight coefficient includes at least initially assuming that the weight coefficient is proportional to the inverse of the variance of a measurement error of the measured value of the received uplink signal power of the transmission channel to which the channel specific estimator relates.

10. The method of claim 7, further comprising
comparing the most recently obtained value of the channel specific estimator with at least one previously obtained value of the channel specific estimator the comparing resulting in a time variation result; and
determining, based on the time variation result, whether the initially assumed value of the weight coefficient should be adjusted.

11. The method of claim 7, further comprising
comparing the value of one second or further channel specific estimator with at least one value of another second or further channel specific estimators, the comparing resulting in a transmission channel variation result; and
determining, based on the transmission channel variation result, whether the initially assumed value of the weight coefficient should be adjusted.

12. A received uplink signal power estimator adapted to receive a signal comprising information transmitted by a transmitting node over at least two transmission channels, wherein the transmitting node is a mobile station, the received uplink signal power estimator being adapted to estimate a received uplink signal power of a first of said transmission channels,
wherein the received uplink signal power estimator is adapted to measure the uplink signal power of at least a second of said transmission channels, to estimate a relationship between the transmission power of the second transmission channel and the transmission power of the first transmission channel; and to estimate the received uplink signal power of the first transmission channel based on a result of the measurement of the uplink signal power of the second transmission channel and said estimated relationship;
wherein the received uplink signal power estimator comprises:
a received uplink signal power detector adapted to measure the received uplink signal power of a second of said at least two transmission channels and to generate a signal indicative of the measured received uplink signal power;
a scaling mechanism connected to an output of the received uplink signal power detector and adapted to receive the signal indicative of the measured received uplink signal power, the scaling mechanism being further adapted to
determine a scaling factor based on an estimation of the ratio of the transmission power of the second transmission channel to the transmission power of the first transmission channel;
estimate the received uplink signal power of the first transmission channel by applying the scaling factor to measured received uplink signal power, thereby generating a channel specific estimator; and
generate a signal indicative of the channel specific estimator.

13. The received uplink signal power estimator of claim 12, wherein the received uplink signal power estimator is adapted to measure the received uplink signal power of at least two of said transmission channels and to generate corresponding channel specific estimators, the received uplink signal power estimator further comprising:
a weight coefficient generator adapted to receive a signal indicative of a measurement of the received uplink signal power and/or the channel specific estimator of a transmission channel, and to generate a weight coefficient for the transmission channel; and
wherein the received uplink signal power estimator is further adapted to performe the estimation of the received uplink signal power of the first transmission channel in dependence on said weight coefficient.

14. A radio base station comprising the received uplink signal power estimator of claim 12.

15. A non-transitory computer program product comprising instructions which, when executed, perform the acts of claim 1.

16. A non-transitory computer program product comprising instructions which, when executed, perform the acts of claim 4.

17. A base station of a communications system which receives a received signal comprising information transmitted by a transmitting node over at least two transmission channels, the transmitting node being a mobile station, the base station comprising:
a detector configured to measure the received uplink signal power of a second of the at least two transmission channels and uplink signal power of at least one further transmission channel;
a processor configured to:
estimate a relationship between the transmission power of the second transmission channel and the transmission power of the first transmission channel;
estimate the received uplink signal power of the first transmission channel using the measurement of the received uplink signal power of the second transmission channel and said estimated relationship;
estimate a relationship between the transmission power of the further transmission channel to the transmission power of the first transmission channel by using the received uplink signal power of the at least one further transmission channel and the at least one estimated relationship between the transmission power of the first and further transmission channels.

* * * * *